United States Patent [19]

Lorenz et al.

[11] Patent Number: 5,326,137
[45] Date of Patent: Jul. 5, 1994

[54] GAS RISER APPARATUS AND METHOD

[75] Inventors: James M. Lorenz, Madison; James L. Bucks; John C. Bucks, both of Mentor, all of Ohio

[73] Assignee: Perfection Corporation, Madison, Ohio

[21] Appl. No.: 35,665

[22] Filed: Mar. 23, 1993

Related U.S. Application Data

[63] Continuation-in-part of Ser. No. 764,458, Sep. 24, 1991, abandoned.

[51] Int. Cl.$^5$ ............................................. F16L 55/00
[52] U.S. Cl. ...................... 285/55; 285/174; 285/258; 285/286; 29/507; 29/523
[58] Field of Search ............ 285/258, 259, 256, 133.1, 285/362.4, 15, 138, 382.5, 286, 174, 173, 55; 29/507, 522.1, 523

[56] References Cited

U.S. PATENT DOCUMENTS

| | | |
|---|---|---|
| 8,214 | 5/1878 | Moore . |
| 566,136 | 8/1896 | Caldwell . |
| 635,636 | 10/1899 | Bailey . |
| 1,924,712 | 8/1933 | Eisenman . |
| 2,133,313 | 10/1938 | Weatherhead . |
| 2,228,018 | 1/1941 | Scholtes . |
| 2,340,852 | 2/1944 | Wormeley . |
| 2,523,578 | 9/1950 | Lewis . |
| 2,613,431 | 10/1952 | McGee . |
| 2,764,427 | 9/1956 | Andrus . |
| 3,068,563 | 12/1962 | Reverman . |
| 3,093,161 | 6/1963 | Jacobson . |
| 3,108,826 | 10/1963 | Black . |
| 3,165,338 | 1/1965 | Moss . |
| 3,317,221 | 5/1967 | Brown . |
| 3,534,988 | 10/1970 | Lindsey . |
| 3,572,768 | 3/1971 | James . |
| 3,665,591 | 5/1972 | Kowal . |
| 3,689,111 | 9/1972 | Osmun et al. . |

(List continued on next page.)

FOREIGN PATENT DOCUMENTS

| | | |
|---|---|---|
| 3542048 | 6/1987 | Fed. Rep. of Germany . |
| 3707341 | 9/1988 | Fed. Rep. of Germany . |
| 1495499 | of 0000 | France . |
| 1325153 | 3/1963 | France . |
| 2625287 | 6/1989 | France . |
| 496427 | 12/1975 | U.S.S.R. . |
| 661268 | 11/1951 | United Kingdom . |
| 1557813 | 12/1979 | United Kingdom . |

Primary Examiner—Dave W. Arola
Attorney, Agent, or Firm—Fay, Sharpe, Beall, Fagan, Minnich & McKee

[57] ABSTRACT

An improved gas riser comprises a pipe nipple, casing, adaptor sleeve, tube, and stiffener. The adaptor sleeve features an internal stop which accurately positions an end of the plastic tube before the tube is plastically deformed into grooves in an internal surface of the adaptor sleeve. Each of the first and second ends of the adaptor sleeve can be manufactured in different diameters to fit pipe nipples and casings that are required by different code regulations. The method of assembling the gas riser comprises inserting a first end of the adaptor sleeve into a second end of a pipe nipple, inserting a second end of the adaptor sleeve into a first end of the casing, welding the second end of the pipe nipple and the first end of the casing to the adaptor sleeve, inserting a stiffener into a tube end, inserting the tube end into the adaptor sleeve, pulling a mandrel through the assembly which plastically deforms the stiffener and forms a seal by urging the tube into grooves on an interior surface of the adaptor sleeve.

35 Claims, 8 Drawing Sheets

U.S. PATENTS DOCUMENTS

| Number | Date | Name |
|---|---|---|
| 3,814,466 | 6/1974 | Leopold, Jr. |
| 3,817,559 | 6/1974 | Tricini |
| 3,837,686 | 9/1974 | Powell |
| 3,861,719 | 1/1975 | Hand |
| 3,922,008 | 11/1975 | Stiner et al. |
| 3,944,262 | 3/1976 | Stiner et al. |
| 3,987,820 | 12/1976 | Alewitz |
| 4,005,880 | 2/1977 | Anderson et al. |
| 4,011,652 | 3/1977 | Black |
| 4,062,572 | 12/1977 | Davis |
| 4,070,043 | 1/1978 | Becker |
| 4,083,583 | 4/1978 | Volgstadt et al. |
| 4,085,850 | 4/1978 | Alewitz |
| 4,094,536 | 6/1978 | Cole et al. |
| 4,094,537 | 6/1978 | Lyall |
| 4,229,025 | 10/1980 | Volgstadt et al. |
| 4,279,435 | 7/1981 | Alewitz |
| 4,284,297 | 8/1981 | Godkin |
| 4,293,147 | 10/1981 | Metcalfe et al. |
| 4,427,112 | 1/1984 | Giovanni |
| 4,482,170 | 11/1984 | Jacobson et al. |
| 4,519,634 | 5/1985 | Hand |
| 4,548,427 | 10/1985 | Press et al. |
| 4,635,972 | 1/1987 | Lyall |
| 4,712,813 | 12/1987 | Passerell et al. |
| 4,715,624 | 12/1987 | Frye |
| 4,793,638 | 12/1988 | Baldwin, Jr. |
| 4,801,159 | 1/1989 | Schorn |
| 4,809,418 | 3/1989 | Bürli |
| 5,162,801 | 7/1989 | Kresky et al. |

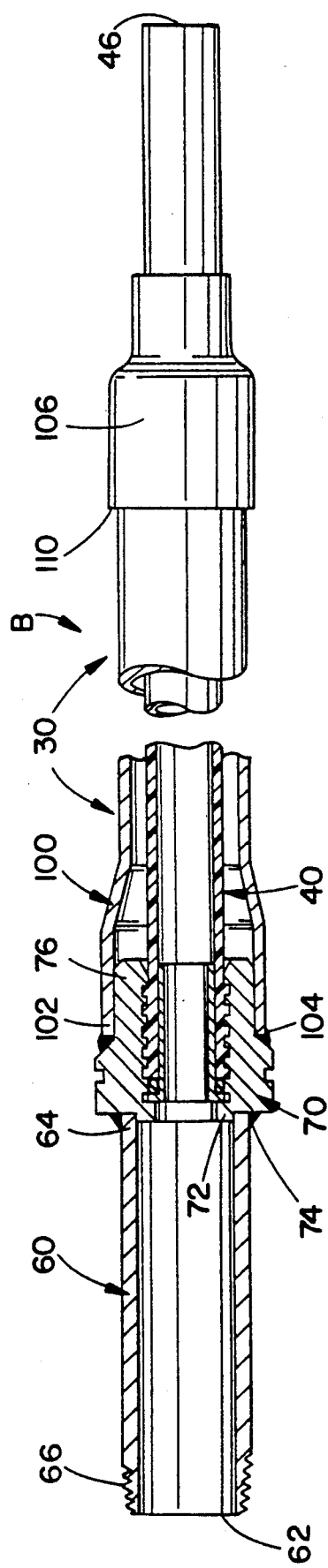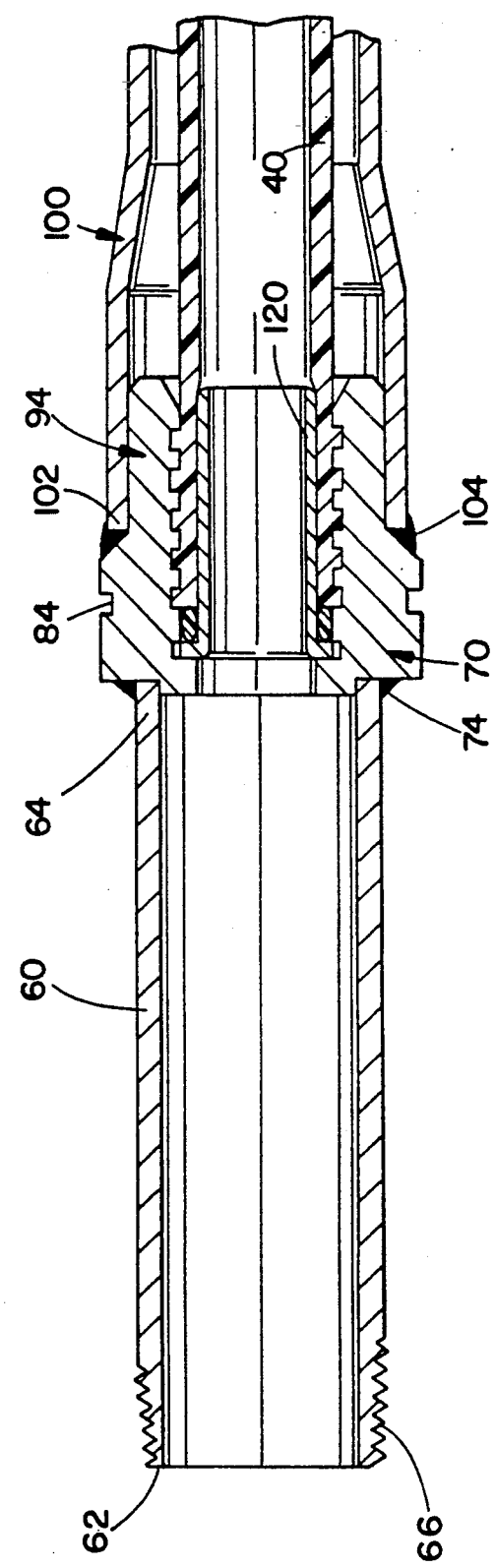
FIG. 3
FIG. 4

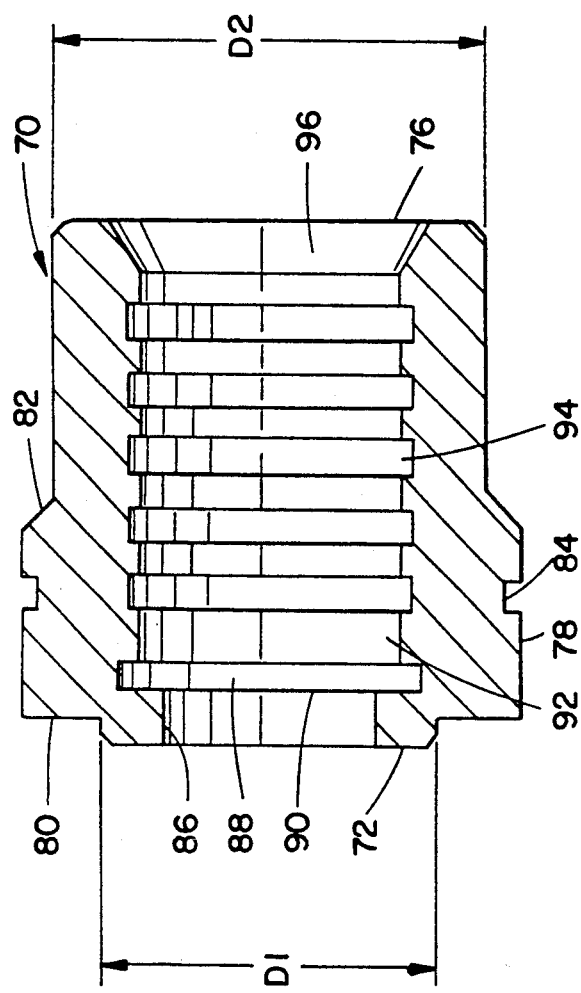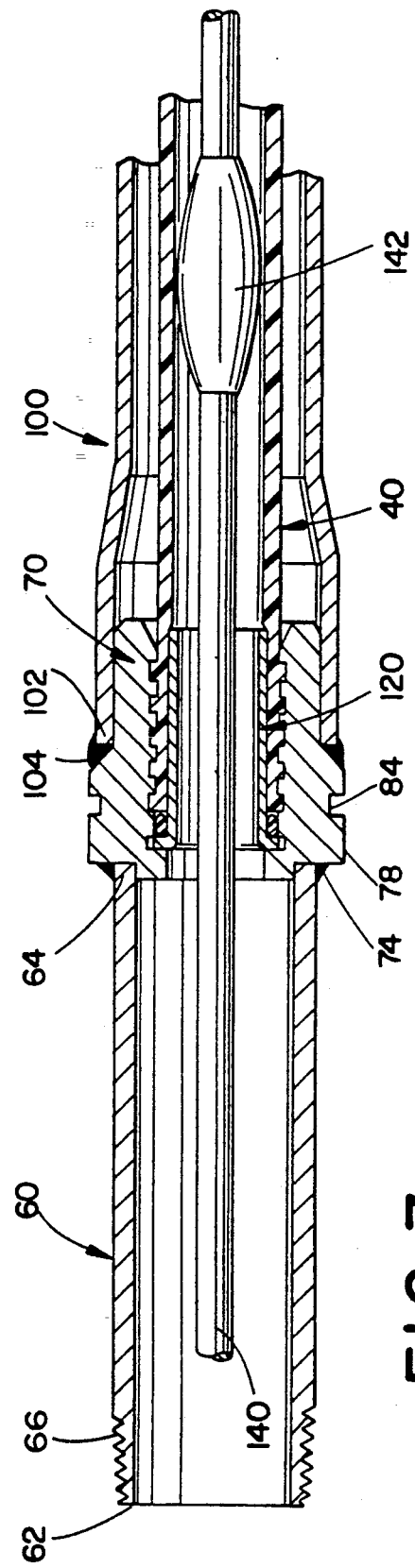

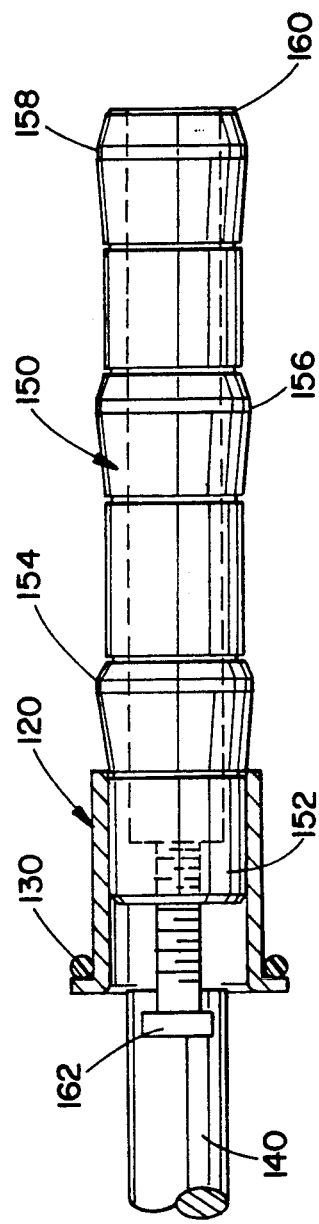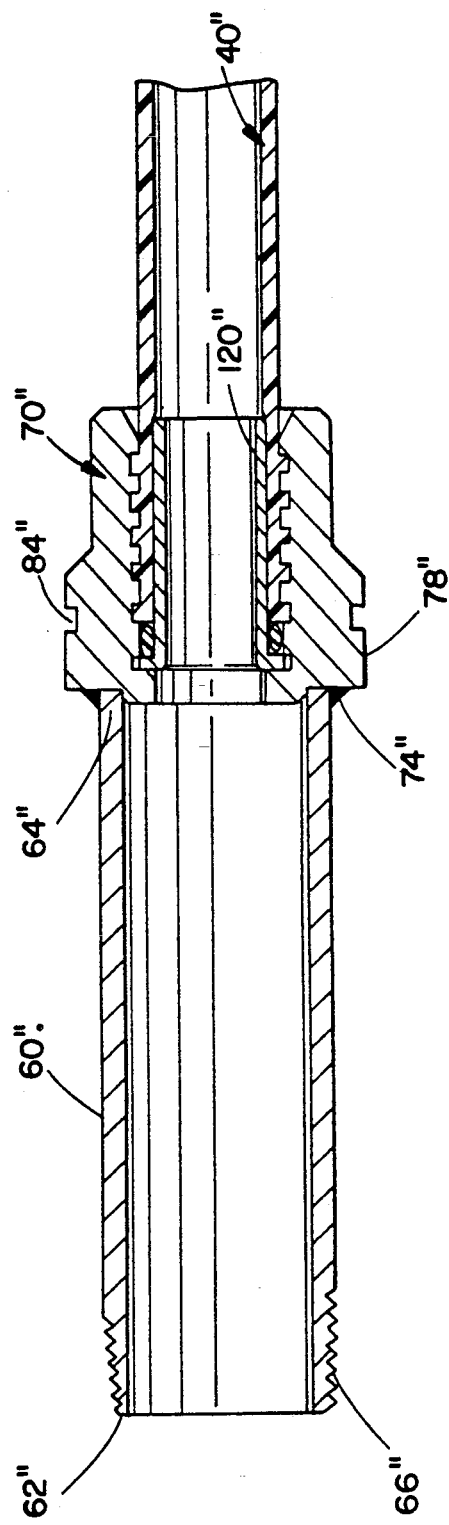

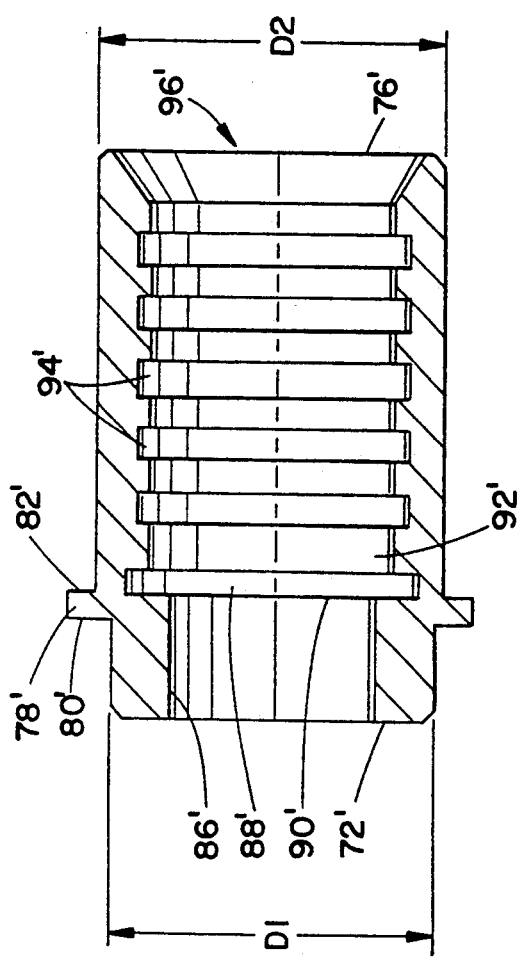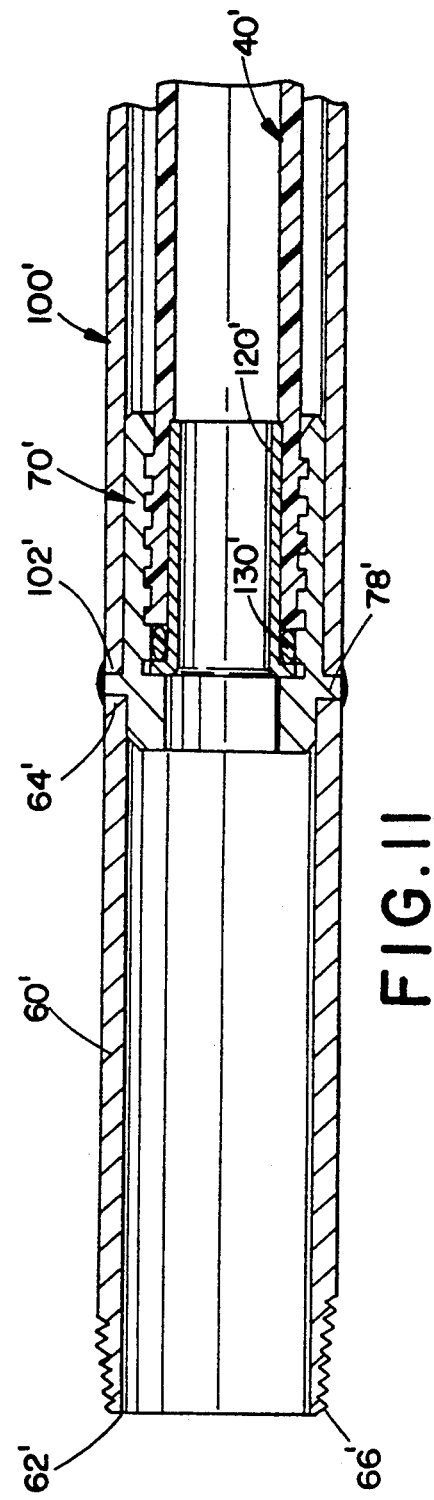

GAS RISER APPARATUS AND METHOD

This is a continuation-in-part application of pending application Ser. No. 07/764,458, filed Sep. 24, 1991 and now abandoned.

BACKGROUND OF THE INVENTION

This application is directed to an apparatus and method for conducting pressurized fluid from a source of supply to a delivery point through a metal-to-plastic transition fitting. More particularly, this invention relates to a gas riser which is used to deliver natural gas from a main to a point of use through plastic and metal conduits, tubes or pipes, as well as a method of assembling such a gas riser.

Conventional gas risers comprise a metal casing or pipe at one end and a plastic pipe or tube at the other end. The metal pipe is typically connected to a delivery member such as a gas meter manifold at a location above ground. The plastic tube, on the other hand, is connected to an underground service line which is oftentimes a plastic pipe construction. The metal pipe and plastic tube are joined together at a transition joint. For example in a double walled riser, an outer metal pipe is provided at locations above ground and surrounds the inner plastic tube. The transition between the plastic tube and metal pipe in the gas riser includes a seal, examples of such structures including U.S. Pat. Nos. 3,987,820 and 4,482,170.

Different city and state government codes have their own requirements regarding gas riser constructions. These codes require different wall thicknesses and seal constructions so that a gas riser manufacturer must provide a wide variety of structural arrangements. From an assembly standpoint, this requires a large amount of customized manufacturing in order to meet the different code requirements. Therefore, it has been deemed desirable to provide a gas riser structural arrangement that is easily adapted to various code requirements.

Still other prior art gas riser arrangements provide alternative plastic-to-metal transition joints. Some of these arrangements, though, are deemed to be more difficult to assemble or omit more desired features since the plastic necessitates such an arrangement. For example, it is often desired to provide an epoxy coating on the outer metal casing for corrosion protection. Preferably, the entire length of the outer casing of the gas riser would be coated with the epoxy in a single process step. This would provide an end-to-end epoxy coated outer metal casing that is less subject to corrosion problems, as opposed to other coated casings that apply the epoxy in multiple steps.

Moreover, a preferred method of applying the epoxy coating to the metal casing uses elevated temperatures that could adversely affect any elastomer seal or plastic pipe that may be contained in the casing if necessary precautions or design alterations are not undertaken to protect the elastomer seal or plastic tube. Therefore, it is preferred to complete the assembly of the gas riser outer casing in its entirety, including epoxy coating, from end to end and be able to subsequently install the plastic and elastomeric components.

In a similar vein, the outer metal casing is usually a multipart structure in which the metal components of the casing are joined together. For example, a major portion of the outer casing can be provided by a metal tube or conduit. It is then adapted to receive various size pipe fittings or nipples at an upper, terminal end for connection to a gas meter manifold. A preferred manner of connecting the pipe fitting and the remainder of the metal casing is to weld the two components together. Because of the potential for elevated temperatures associated with the welding operation adversely affecting any plastic or elastomeric component, the metal-to-plastic joint transition is preferably at an area spaced from the weld region. Alternatively, other arrangements can be made to protect the plastic/elastomer members from the high temperature.

If, on the other hand, the outer metal casing is completely assembled end-to-end and epoxy coated, it has heretofore been deemed unworkable to subsequently install the inner plastic tube and assure a proper metal-to-plastic sealed connection. The subject invention is deemed to meet these needs and others in a simple, economical manner.

SUMMARY OF THE INVENTION

The present invention contemplates a new and improved gas riser and method of assembling same that overcomes all of the above-referenced problems.

According to the present invention, a metal-to-plastic transition in the gas riser includes an adaptor sleeve that connects at one end to a pipe fitting and to a tube at the other end. The tube is sealed to the adaptor sleeve through a radial outward deformation of the tube, portions of the tube being received in a securing means in the adaptor sleeve.

According to another aspect of the invention, the gas riser comprises a pipe nipple, casing, adaptor sleeve, tube, and stiffener. Opposite ends of the adaptor sleeve are initially connected to the pipe nipple and casing, respectively. A first end of the tube receives the stiffener, and the combined stiffener/tube is located in the adaptor sleeve for subsequent sealing by passing a mandrel therethrough.

According to another aspect of the invention, the sealing means is defined by a series of grooves on an inner surface of the adaptor sleeve. Radial outward deformation of the stiffener urges an outer surface of the plastic tube into the grooves to define a secure, sealed connection.

A principal advantage of the invention resides in the ability to complete assembly of the outer metal casing from one end to the other and subsequently insert the plastic tube into a precise, sealed engagement.

Another advantage of the invention is the ability to accommodate different sizes and types of pipe nipples, metal casings, plastic tubes, etc., without substantially altering remaining components of the gas riser or method of assembling same.

Another advantage of the invention is the cost savings obtained by using different wall thicknesses in the casing and the pipe nipple while meeting various code requirements.

Still another advantage of the invention is the low cost, high quality manufacturing method for the gas riser.

Yet another advantage of the invention is greater uniformity, and therefore quality, in the metal-to-plastic joint because of the accurate placement of the tube within the outer casing.

Still other benefits and advantages of the present invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 3 is an elevational view, partly in section, showing a gas riser formed in accordance with the teachings of the subject invention;

FIG. 4 is an enlarged view of a portion of the gas riser shown in FIG. 3;

FIG. 6 is an enlarged, cross-sectional view of one preferred adaptor sleeve;

FIG. 7 is an elevational view of a portion of the gas riser, selected components shown in cross section and adapted to receive a mandrel as used in accordance with a preferred manufacturing method;

FIG. 9 shows a carrier member in accordance with the subject invention;

FIG. 10 is an enlarged, cross-sectional view of another preferred adaptor sleeve;

FIG. 11 is an enlarged view of a portion of a gas riser incorporating the adaptor sleeve of FIG. 10;

DETAILED DESCRIPTION OF THE PREFERRED EMBODIMENTS

Figure 1:
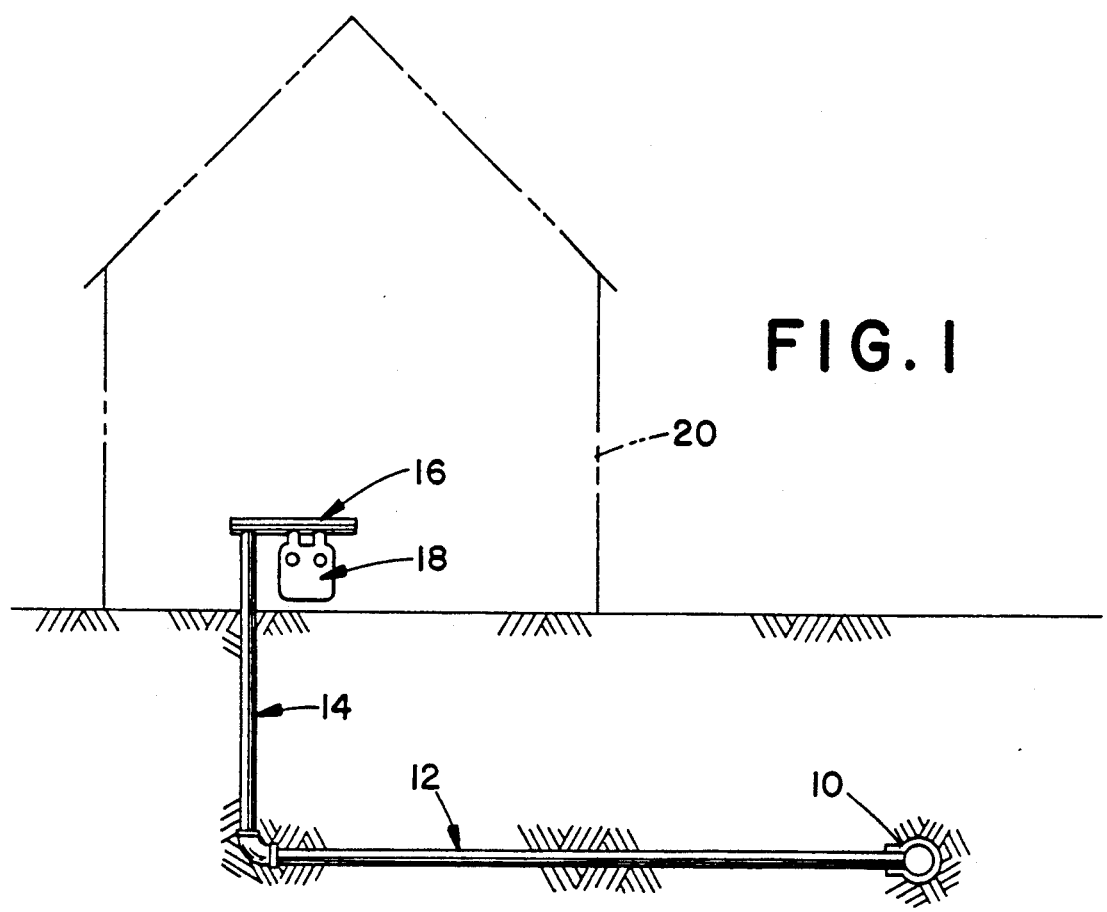
FIG. 1 is a schematic view showing one example of a prior art apparatus for providing transmission of pressurized gas from a main to a meter at a residence.

Referring now to the drawings wherein the showings are for purposes of illustrating preferred embodiments of the invention only, and not for purposes of limiting same, the FIGURES show a gas supply system A for providing natural gas service through a gas riser B from a source to an end use.

More specifically, and with reference to FIG. 1, the gas supply system includes a main 10 to which is connected a service line 12 that communicates with a vertical pipe section 14. An upper terminal end of the vertical pipe section is in operative communication with manifold 16 of a gas meter 18. The gas meter may be associated with any end use, such as metering the natural gas supply to a residential home 20.

Figure 2:
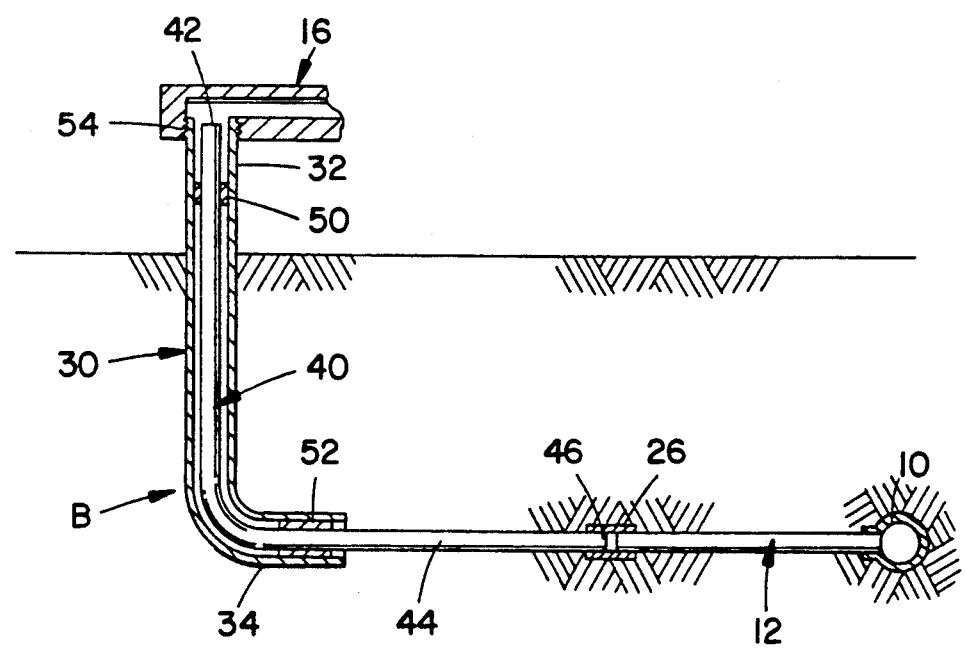
FIG. 2 is a schematic view showing the attachment of a prior art gas riser to a gas meter and to an underground service line.

FIG. 2 represents the same general gas supply system comprised of the gas main 10 which is tapped by one end of the service line 12. A coupling 26 receives the other end of the service line and sealingly connects the service line to a gas riser B. More particularly, the illustrated gas riser is a double walled riser that includes a first or outer metal casing 30. The casing has a first or upper end 32 disposed above ground and a second or lower end 34 typically disposed underground. Generally coaxially received in the outer casing is a second or inner plastic tube 40 having a first or upper end 42 and a second or lower end 44 that preferably extends outwardly beyond the second end of the casing. The second or lower end of the plastic tube 40 is often referred to as a pigtail and has a terminal end 46 that communicates with the service line through the sealed interconnection provided by coupling 26. It will be understood by one of ordinary skill in the art that the coupling 26 can be any one of a number of commercially available couplings that provides an effective sealed interconnection between the service line and the end of the gas riser.

First and second seal members 50, 52 are typically disposed between the inner tube and outer casing of the double walled riser. The first or upper seal member 50 limits the flow of fluid between the tube 40 and the outer casing 30. Moreover, the second seal member 52 is oftentimes used to prevent water and dirt from entering the annular space between the tube and casing at an area disposed underground.

The upper end 32 of the outer casing includes means for connecting the gas riser to the manifold 16. In a preferred arrangement, the connecting means is defined by external threads 54 that cooperate with a threaded opening in the manifold. Of course still other connecting arrangements can be used without departing from the scope and intent of the subject invention.

Figure 5:
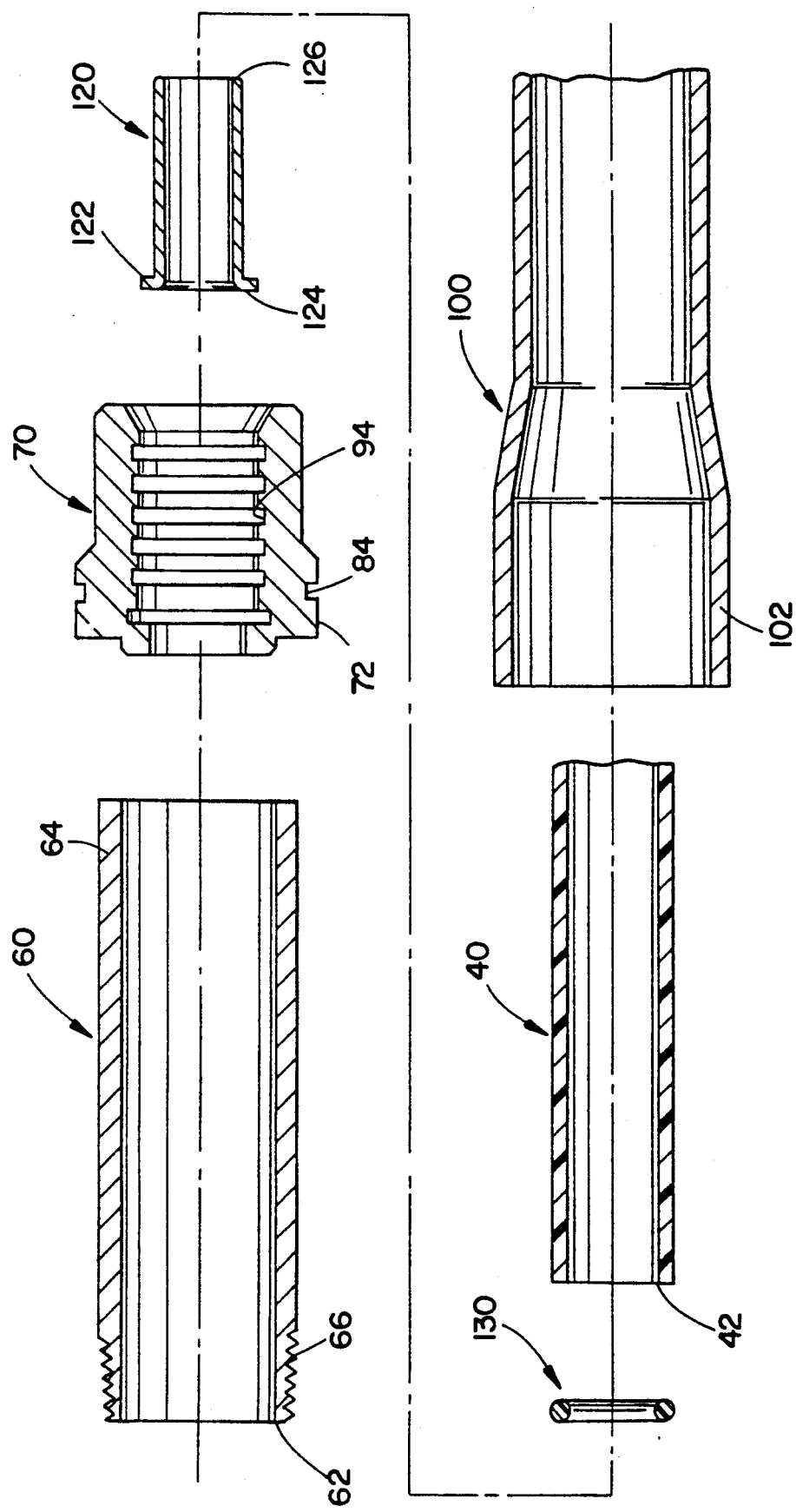
FIG. 5 is an exploded, cross-sectional view of the riser shown in FIG. 3.

With continued references to FIGS. 1 and 2, and additional reference to FIGS. 3-8, a preferred embodiment and method of assembling a gas riser incorporating a metal-to-plastic transition will be described in greater detail and in accordance with the teachings of this invention. Specifically, the outer metal casing 30 is comprised of three major components that are preferably welded together, namely, (i) a pipe fitting or nipple, (ii) adaptor sleeve, and (iii) an outer casing. The pipe nipple 60 has opposed first and second ends 62, 64, respectively. The first end includes external threads 66 that cooperate with the threaded opening in the gas manifold in generally the same manner as described above. As will be recognized, the first end 62 of the pipe nipple is equivalent to the first end 32 of the double walled gas riser illustrated in FIG. 2. The second end 64 of the pipe nipple is dimensioned for cooperative relation with the adaptor sleeve 70. More specifically, the second end of the pipe nipple is closely received over an axial extension 72 of the adaptor sleeve, and preferably welded at 74 to define a secure, sealed interconnection. As best shown in FIGS. 5 and 6, the first end 72 defining the axial extension is of slightly reduced diameter D1 relative to a second end 76 having an enlarged diameter D2.

Disposed between the opposite ends of the adaptor sleeve is an enlarged diameter land or flange 78 (FIG. 6). One end face 80 of the land defines an abutment surface to assure precise location of the pipe nipple prior to welding. An angled surface 82 is provided on the opposite end face of the land which is welded to the third component of the outer casing to be described below. The land also includes a locating means which is preferably a peripheral, circumferentially continuous groove 84. As will be understood by those skilled in the art, the locating means could adopt still other configurations, although the groove 84 is deemed to be a simple and effective locating means.

A throughbore or opening 86 in the adaptor sleeve has a generally stepped configuration as it extends from the first end 72 to the second end 76. Specifically, it includes a radial groove 88 that defines a stop surface 90. A reduced diameter region 92 is located axially adjacent the groove 88 for reasons which will become more apparent below. Extending toward the second end 76, as shown in FIG. 6, a series of axially spaced grooves 94 define a sealing means in the gas riser. Lastly, and extending axially inward from the second end of the adaptor sleeve, the bore includes a tapered surface 94 that facilitates receipt of components into the adaptor sleeve, again, as will be described in greater detail below.

The third major component of the outer casing is metal pipe 100. It has a first end 102 dimensioned for close receipt over the second end 76 of the adaptor sleeve. Preferably, the first end is welded at 104 to the adaptor sleeve adjacent the angled end face 82 to define a secure, sealed interconnection therewith. The pipe 100 may be belled at its first end for receipt over the adaptor sleeve or in some instances may be of substantially constant diameter throughout its length. A second end 106 of the pipe terminates beneath a slip seal 110 (FIG. 3) and is equivalent to the second end 34 of the double walled gas riser shown in FIG. 2.

Figure 8:
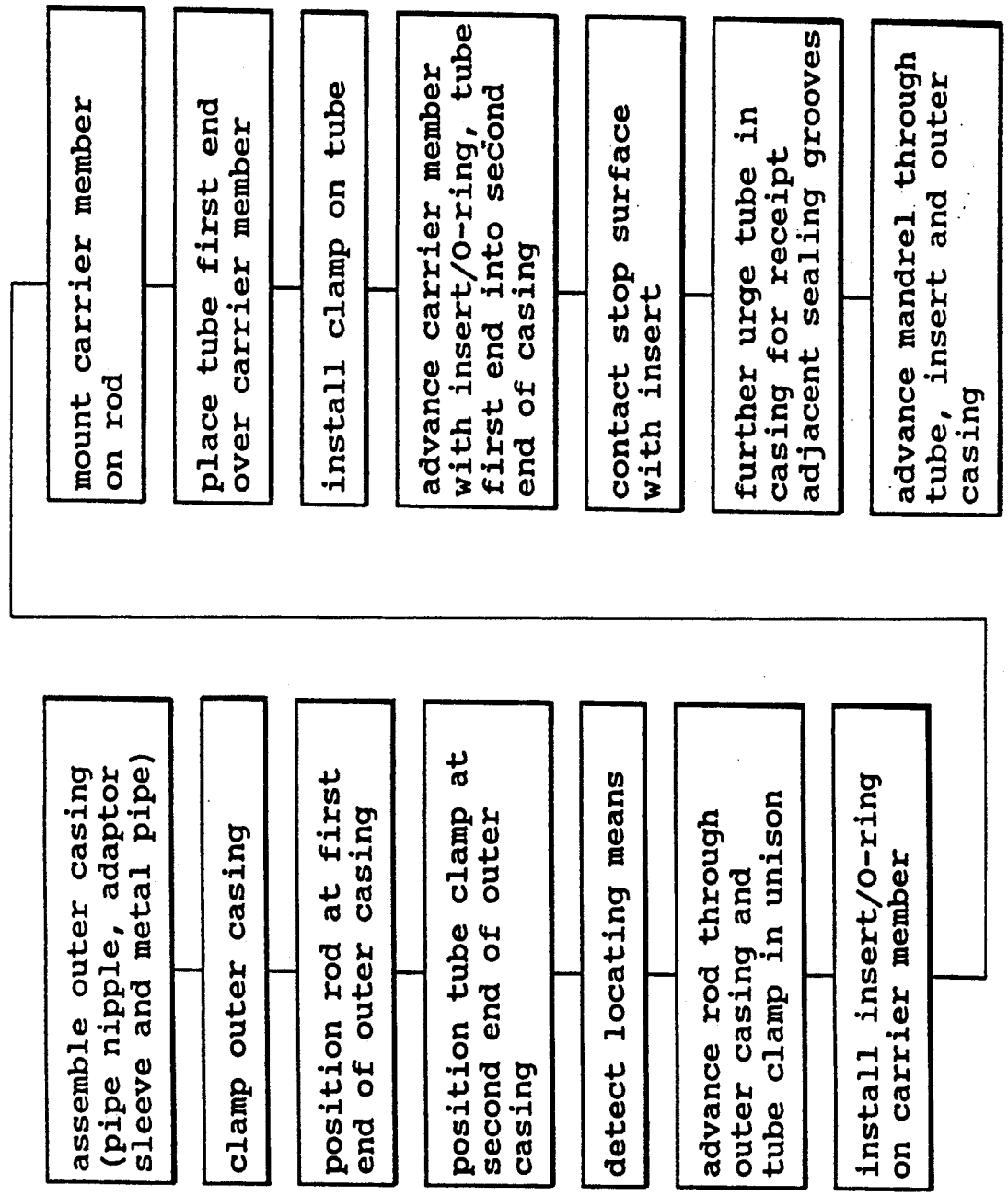
FIG. 8 is a flow chart representing various steps in assembling the gas riser.

According to the preferred method of assembly as detailed by the flow chart of FIG. 8, these three major components that comprise the outer casing are initially assembled together. That is, the adaptor sleeve is machined to the desired dimensions to receive the pipe nipple at one end and the metal pipe 100 over the other end. Of course, different dimensions can be provided on various adaptor sleeves to accommodate different size pipe nipples and metal pipes as desired, or as required by code. Each of the pipe fitting and the metal pipe are then secured to the adaptor sleeve, preferably by a welded interconnection. The entire outer casing of the gas riser is then treated for corrosion protection such as coating the casing with an epoxy or other equivalent corrosion protection material.

As briefly described above, according to some preferred epoxy coating methods, the casing is raised to an elevated temperature, i.e., on the order of 200° F. Since the elevated temperatures are not desired for the plastic or elastomeric components of the gas riser, the outer casing is preferably and advantageously epoxy coated at this stage of assembly. Likewise, the welds 74, 104 could subject selective components of the gas riser to elevated temperatures. Therefore, it is preferred, in fact desired, that any assembly steps requiring elevated temperatures be completed prior to insertion of the plastic tube 40 into the gas riser.

Once the outer casing is complete, it is then necessary to accurately insert and locate the plastic tube 40. Since the plastic tube is to be sealingly engaged with the outer casing, i.e., with the grooves 94 of the adaptor sleeve, a stiffener or insert 120 is preferably initially inserted ahead of the plastic tube into the outer casing. Under some circumstances, and depending on code requirements, an insert may not be required within the plastic tube. For purposes of the following discussion, it is presumed that an insert is required and, unless noted to the contrary, this description is equally applicable to metal-to-plastic transitions that do not require a metal insert.

The metal insert 120 is preferably a seamless construction that includes a radially outward directed flange 122 at a first end 124 (FIG. 5). A second end of the insert is preferably of narrowed diameter and adapted for close receipt within the tube 40. Moreover, a seal member such as elastomeric O-ring 130 is received over the insert and axially positioned between the flange and the first end 42 of the tube.

According to a preferred method, the O-ring is advanced over the first end of the insert into abutting relation with the flange. The flange is then received within the first end 42 of the tube. The insert/O-ring/plastic tube subassembly is then advanced, i.e. pushed or pulled, through the outer casing second end 106 into the adaptor sleeve. The flange is dimensioned to abuttingly engage the stop surface 90 in the adaptor sleeve which, in turn, axially locates the O-ring for radial confinement by the reduced diameter region 92. The tube end 42, on the other hand, is located at the innermost end of sealing means as defined by the grooves 94.

The insert, O-ring, and plastic tube are advanced into the outer casing by means of an elongated rod 140 (FIG. 7 or FIG. 9). The rod is advanced through the first end 62 of the pipe nipple, i.e. the first end of the outer casing, through the adaptor sleeve, and through the metal pipe to its second end 106. A carrier member 150 (FIG. 9), referred to as a dart, receives the insert 120 and O-ring 130 thereon and is itself removably connected to the rod for subsequent advancement through the outer casing toward the stop surface 90 in the adaptor sleeve.

More particularly, the carrier member is dimensioned at a first end 152 to receive the insert thereover. A series of expanding surfaces 154, 156, 158 incrementally increase in diameter from the first end toward a second end 160 of the carrier member. These expanding surfaces are each greater in diameter than an internal opening through the insert so that they deform the insert and plastic tube radially outward toward the sealing grooves. Once the insert engages the stop surface 90 of the adaptor sleeve, the carrier member is further advanced by rod 140 leftwardly and the surfaces 154, 156, 158 progressively deform the insert and tube into sealing engagement with the outer casing.

As shown, a threaded member 162 removably connects the carrier member to the rod 140. A cooperating T-shaped slot is formed in the end of the rod to receive the threaded member. Of course, still other connecting arrangements could be used as will be understood by one skilled in the art.

Irrespective of the particular mandrel used, the plastic tube is slipped over the end of the mandrel and advanced into the outer casing in conjunction with the insert and O-ring. Once the location of the insert, O-ring, and tube end 42 are assured, the rod 140 carrying a mandrel 142 is advanced (leftwardly as shown in FIG. 7) through the tube, insert, adaptor sleeve, and pipe fitting. According to the preferred arrangement of FIG. 9, the mandrel is defined by the enlarged diameter surfaces 154, 156, 158 of the carrier member while the embodiment of FIG. 7 illustrates that still other mandrel arrangements can be used with equal success. Since the outer diameter of the mandrel is greater than the inner diameter of the insert 120, the insert is plastically and permanently deformed radially outward. This, in turn, urges the outer surface of the tube first end 42 into the sealing grooves 94 and preloads the O-ring 130 for sealing interconnection between the insert and adaptor sleeve.

The expanding mandrel (i.e., the separate mandrel of FIG. 7 or the carrier member of FIG. 12) is advanced through the assembly to complete the deformation process which results in an effective sealed interconnection between the tube 40 and outer casing 30, specifically the adaptor sleeve portion 70 thereof. As is evident from the above-described method of assembly, the entire outer casing is assembled prior to advancement of the insert, O-ring, and plastic tube 40 in the outer casing and prior to the sealing deformation performed by the mandrel 142. It is, therefore, important to precisely locate the insert and tube end 42 relative to the outer casing.

According to the subject invention, this is achieved via the locating means associated with the outer casing. Since the adaptor sleeve is a machined member, the locating means as defined by groove 84 is precisely positioned relative to, for example, the pipe nipple first end 62, the stop surface 90 and sealing grooves 94, etc. Therefore, even though the outer casing comprised of the pipe nipple, adaptor sleeve, and metal pipe is already welded together, the location of the stop surface and sealing means is accurately known because of the locating means. It will be understood that instead of the locating groove 84, a boss, magnetic strip, or still other equivalent locating means that provides a precise location on the adaptor sleeve and allows the location of the sealing means and stop surface to be determined, can be used.

By way of example only, the outer casing 30 is positioned in an assembly apparatus and clamped in place. The rod 140 is then advanced to the first end of the outer casing. A position sensor seeks the location of groove 84. A numerical controller (not shown) receives a signal indicating that the location of the groove 84 has been determined by the position sensor. A plastic tube clamp is positioned adjacent the other end 34, 106 of the outer casing and as rod 140 is advanced into the outer casing, the plastic tube clamp is simultaneously moved the same distance away from the second end of the outer casing.

The rod end is advanced until it extends outward from the outer casing second end 34 and then movement of the rod and tube clamp is terminated. The insert and O-ring are placed on the carrier member and the carrier member is attached to the rod end. A plastic tube of predetermined length is loaded into the assembly apparatus, particularly the first end 42 of the tube being slipped over the end 160 of the carrier member and advanced into position over the insert and O-ring. The tube is also clamped at a position spaced from the end of the outer casing since, as described above, the clamp was advanced in unison with the rod after the position of the locating groove was sensed. Thus, the tube is secured by the clamp adjacent the second end 46. The assembled gas riser has a preselected length of the plastic tube extending axially outward from the outer casing (FIGS. 2 and 3).

The rod, the carrier member with the attached insert and the O-ring, plastic tube and tube clamp are advanced in unison (leftwardly as shown) through the outer casing toward the adaptor sleeve. Since the position of the locating groove was previously determined and that information provided to the numerical controller, the required amount of travel toward the stop surface is substantially known. Therefore, the rod advances the flange of the insert to the stop surface and the clamp member advances the tube first end 42 beneath the sealing grooves 94. Nevertheless, limited relative movement between the insert and tube can be provided after the insert has engaged the stop surface to be sure that the plastic tube is properly positioned beneath the sealing grooves. In other words, the plastic tube and clamp member can be advanced leftwardly relative to the insert and outer casing to assure that the tube first end is precisely located beneath the sealing grooves.

Once it has been determined by the numerical controller that the insert and plastic tube are accurately located, the carrier member or mandrel is advanced leftwardly through the insert, adaptor sleeve, and pipe nipple. The enlarged diameter of the mandrel deforms the insert radially outward which urges the outer surface of the tube first end 42 into sealed engagement with the sealing grooves 94 of the adaptor sleeve. The mandrel then exits the first end 62 of the outer casing and the operation is repeated for the next double walled gas riser. The second end of the outer casing can be subsequently terminated to receive seal member 52 and, if desired, slip seal 110. A preselected length of the plastic tube will extend axially outward from the outer casing of the completed riser for connection to a service line through a coupling 26 as described above. These assembly steps are summarized in FIG. 8.

As will be appreciated, prior machining of the adaptor sleeve can accommodate different sized pipe nipples and metal pipes 100. The adaptor sleeve is a relatively inexpensive component and enables a variety of different size pipe nipples to be combined with a variety of different size outer pipes. For example, some codes require a minimal wall thickness in the riser outer casing at the meter manifold. This thickness may exceed the required thickness of the metal pipe 100. For example, code might require that the pipe nipple be manufactured from schedule 80 pipe while the metal pipe 100 is required to be schedule 40 pipe. By previously adjusting the outside diameter D2 of the adaptor sleeve, a thinner wall thickness of the metal pipe may be coupled with a thick walled pipe nipple. Moreover, the outside diameters of the metal pipe and the pipe nipple can be chosen to be approximately equal so that a flush, continuous diameter appearance may be obtained at opposite ends of land 78. Still further, costs savings result because a less expensive metal pipe can be used.

The outer casing can also be provided with some type of identification that indicates the size of pipe nipple and outer casing that are joined by the adaptor sleeve. In other words, an inventory of predetermined outer casings that meet different code requirements can be maintained and a gas riser assembly operator can readily identify the size of the casing so it can be matched with the proper size tube, insert, O-ring, carrier member (mandrel), etc. to facilitate the assembly process.

Figure 12:
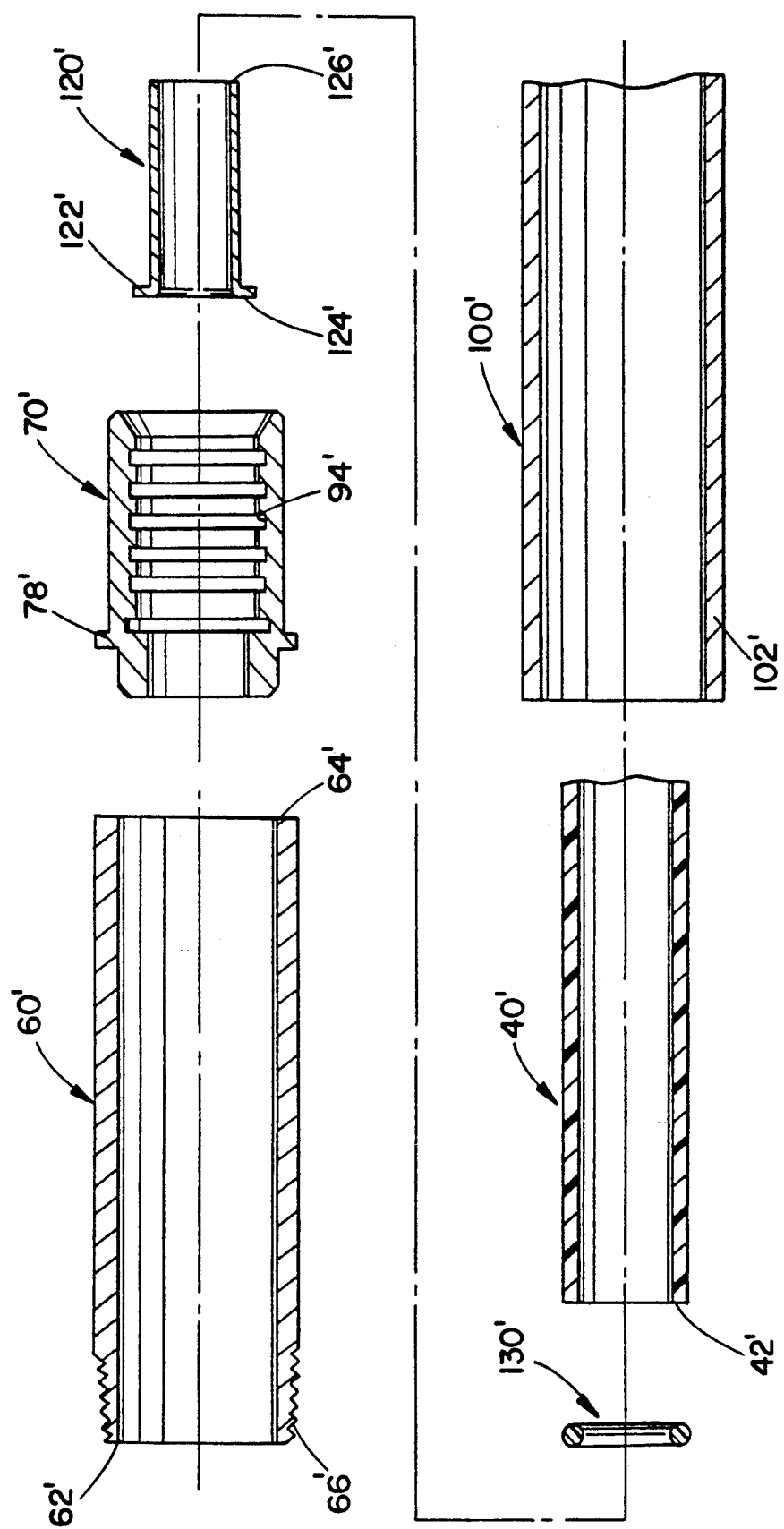
FIG. 12 is an exploded, cross-sectional view of the components of the preferred embodiment of FIG. 10; and, FIG. 13 is an enlarged cross-sectional view of a metal-to-plastic transition fitting formed in accordance with the subject invention.

FIGS. 10–12 illustrate another preferred embodiment, particularly a modified adaptor sleeve 70'. The primary distinction between this embodiment and the embodiment described with respect to FIGS. 3–7 resides in the alteration of the diameters D1, D2 of the adaptor sleeve. Therefore, like elements are referred to by like numerals with a prime suffix (') while new numerals refer to new components. The embodiment of FIGS. 10–12 provides a generally flush appearance and interconnection of the casing components through use of a single weld 150. In other words, the outer diameter of pipe nipple 60' is substantially identical to that of metal pipe 100' and land 78' of the adaptor sleeve so that the single weld 150 can be used to interconnect the pipe nipple, adaptor sleeve, and metal pipe to define the outer casing 30'.

Lastly, the embodiment of FIG. 13 illustrates the same general features of the subject invention without incorporation of a metal pipe into the outer casing. Like reference numerals referring to like components are referenced by a double prime (″) suffix, while new components are identified by new numerals. In this arrangement, the second end of the adaptor sleeve defines the second end of the outer casing. This embodiment demonstrates the applicability of the teachings of this invention to the more general nature of a plastic-to-metal transition fitting.

The invention has been described with reference to the preferred embodiments. Obviously, modifications and alterations will occur to others upon a reading and understanding of this specification. For example, some other means of precision locating can be used as a substitute for the locating groove. A magnetic strip provided at a desired location on the adaptor sleeve will provide an accurate indication of the location of the stop surface 90 and sealing means 94 of the adaptor sleeve. Moreover, the mandrel can be pushed or pulled through the assembly as represented by the rod 140 in FIG. 7. Still further, the plastic tube can be previously cut to length or cut during the assembly operation from a supply of tubing. It is intended to include all such modifications and alterations insofar as they come within the scope of the appended claims or the equivalents thereof.

Having thus described the invention, it is claimed:

1. A method of assembling a metal-to-plastic transition assembly having a pipe fitting, adaptor sleeve, and tube, the method comprising the steps of:
   inserting a first end of the adaptor sleeve into the pipe fitting;
   securing the pipe fitting to the adaptor sleeve;
   pushing a first end of the tube into a second end of the adaptor sleeve until the first end of the tube is adjacent securing means on an inner surface of the adaptor sleeve; and,
   deforming the tube into sealing engagement with the securing means of the adaptor sleeve.

2. The method of claim 1 wherein the tube is deformed by passing a mandrel through a second end of the tube, past the first end of the tube, past the adaptor sleeve, and out a first end of the pipe fitting.

3. The method of claim 1 comprising the further step of inserting a stiffener into a first end of the tube prior to the deforming step.

4. A method of assembling a metal-to-plastic transition assembly, the assembly comprising a pipe fitting, adaptor sleeve, tube, and stiffener, the method comprising the steps of:
   inserting a first end of the adaptor sleeve into the pipe fitting;
   securing the fitting to the adaptor sleeve;
   inserting the stiffener into a first end of the tube;
   advancing the first end of the tube and stiffener into a second end of the adaptor sleeve until the stiffener and said first end of the tube are adjacent securing means on an inner surface of the adaptor sleeve; and,
   passing a mandrel through the tube, past the first end of the tube, past the stiffener and adaptor sleeve, and past the pipe fitting, thereby outwardly deforming the insert and urging the tube into sealing engagement with the securing means on the inner surface of the adaptor sleeve.

5. The method of claim 4 wherein the first end of the tube is advanced into the second end of the adaptor sleeve until said stiffener contacts an internal shoulder in the adaptor sleeve.

6. The method of claim 4 wherein the securing means comprises grooves on the inner surface of the adaptor sleeve.

7. The method of claim 4 further comprising the steps of, after securing the pipe fitting to the first end of the adaptor sleeve:
   passing a first end of a rod through the pipe fitting, through the stiffener, into the first end of the tube, and out a second end of the tube; and,
   attaching the mandrel on the first end of the rod.

8. The method of claim 4 wherein a maximum outside diameter of the mandrel is greater than an inside diameter of the stiffener.

9. An assembled metal-to-plastic transition joint comprising:
   a metal pipe fitting;
   an adaptor sleeve having a first end and a second end and an adaptor sleeve flange therebetween, the adaptor sleeve having grooves in an inner surface thereof, and an internal stop surface, the first end of the adaptor sleeve received within the pipe fitting, the pipe fitting being welded to the adaptor sleeve flange; and,
   a plastic tube having a first end abutting the internal stop surface, and outer surface of said tube near said first end deformed into engagement with the grooves.

10. The transition Joint of claim 9 further comprising:
    a stiffener received within the first end of the tube, the stiffener being formed of a ductile metal so as to be plastically deformed outwardly by application of outwardly directed forces, the plastic deformation causing the tube to sealingly engage the grooves so that an associated fluid within the tube is prevented from leaking between the adaptor sleeve and tube.

11. The transition Joint of claim 10 wherein said stiffener is seamless.

12. A method of assembling a gas riser having a pipe nipple, outer casing, adaptor sleeve, and tube, said method comprising the steps of:
    inserting a first end of the adaptor sleeve into the pipe nipple;
    inserting a second end of the adaptor sleeve into a first end of the outer casing;
    securing the pipe nipple and the first end of the casing to the adaptor sleeve;
    subsequently advancing a first end of the tube into a second end of the outer casing until the tube first end is adjacent securing means on an inner surface of the adaptor sleeve; and,
    deforming said tub into sealing engagement with the securing means of the adaptor sleeve.

13. The method of claim 12 wherein the tube is deformed by passing a mandrel through the tube.

14. The method of claim 12 wherein the tube is deformed by passing a mandrel through a second end of the tube, past the first end of said tube, past the adaptor sleeve, and out a first end of the pipe nipple.

15. The method of claim 12 further comprising the further step of inserting a stiffener into a first end of said tube after securing the pipe nipple and the first end of the outer casing to the adaptor sleeve.

16. A method of assembling a gas riser having a pipe nipple, casing, adaptor sleeve, tube, and stiffener, said method comprising the steps of:
    inserting a first end of said adaptor sleeve into a second end of the pipe nipple;

inserting a second end of said adaptor sleeve into a first end of the casing;

securing the pipe nipple and the first end of the casing to the adaptor sleeve;

inserting the stiffener into a first end of the tube;

advancing the first end of the tube into a second end of the casing until the stiffener and tube first end are adjacent securing means on an inner surface of the adaptor sleeve; and, passing a mandrel through the tube, past the stiffener and adaptor sleeve, and out a first end of the pipe nipple, thereby outwardly deforming the insert and deforming the tube into sealing engagement with the securing means of the adaptor sleeve.

17. The method of claim 16 wherein the first end of the tube is pushed into the second end of the casing until the stiffener contacts an internal wall of the adaptor sleeve.

18. The method of claim 16 wherein the securing means comprises grooves on the inner surface of the adaptor sleeve.

19. The method of claim 16 wherein the securing step includes welding the second end of the pipe nipple to the first end of the casing.

20. The method of claim 16 wherein after securing the second end of the pipe nipple to the first end of the adaptor sleeve, comprising the further steps of:

passing a first end of a rod through the pipe nipple, adaptor sleeve, and casing, out the second end of the casing, through the stiffener, into first end of the tube, and out a second end of the tube; and, attaching the mandrel on the first end of the rod.

21. The method of claim 16 wherein a maximum outside diameter of the mandrel is greater than an inside diameter of the stiffener.

22. The method of claim 16 comprising the further step of positioning a seal ring between the stiffener and adaptor sleeve.

23. The method of claim 16 comprising the further step of positioning a seal ring over the stiffener before inserting the stiffener into the tube first end.

24. The method of claim 16 comprising the further steps of locating an axial position of the adaptor sleeve, moving a mandrel carrying rod and tube clamp in unison in response to the located position of the adaptor sleeve.

25. The method of claim 24 wherein the moving step is completed prior to the stiffener inserting step.

26. The method of claim 24 wherein the adaptor sleeve locating step includes sensing an external groove provided on the adaptor sleeve.

27. A method of assembling a gas riser having a tube and a metal pipe, the metal pipe having first and second ends and grooves on an inner surface thereof, said method comprising the steps of:

passing a first end of an associated rod through the pipe;

passing the rod first end through an annular insert;

passing the rod first end through the tube;

attaching a mandrel to the rod, an outside diameter of the mandrel being greater than an inside diameter of the annular insert;

inserting a second end of the annular insert into a first end of the tube;

pushing the tube first end into the pipe first end until the annular insert and the tube first end are positioned adjacent the grooves on the inner surface of the pipe; and, passing the mandrel through the tube, out of the tube first end, and out of the pipe second end, thereby outwardly deforming the annular insert and the tube first end into sealing arrangement with the grooves on the inner surface of the pipe.

28. An assembled plastic-to-metal transition joint for use in gas risers, said joint comprising:

a metal pipe fitting;

a metal casing;

an adaptor sleeve having first and second ends and a set of grooves defined in an inner surface thereof, the first end of the adaptor sleeve being received within the metal pipe fitting and the second end of the adaptor sleeve being received within a first end of the casing, the pipe fitting and the casing first end being welded to said adaptor sleeve; and, a plastic tube generally coaxially disposed within the casing, an outer surface of the tube near the first end being deformed into locking engagement with the grooves, the engagement preventing axial movement of the tube within the casing.

29. The transition joint of claim 28 further comprising a stiffener receives within the first end of the tube, said stiffener being made of a ductile metal so as to be plastically deformed outwardly by application of an outwardly directed force to sealingly engage the grooves and establish a seal between the tube and adaptor sleeve.

30. A gas riser comprising:

a pipe nipple;

an adaptor sleeve having first and second ends, the first end being received within the pipe fitting; and means attaching said first end to said pipe nipple;

a casing having a first end receiving the second end of the adaptor sleeve; and means attaching said second end to said casing, a tube having a first end received within and sealingly engaging the adaptor sleeve by deformation of a portion of the tube into at least one groove in the adaptor sleeve.

31. The gas riser of claim 30 wherein a wall thickness of the pipe nipple is different from a wall thickness of the casing.

32. The gas riser of claim 30 wherein an inner surface of the adaptor sleeve includes plural grooves that sealingly intermesh with the tube first end.

33. A gas riser comprising:

a pipe nipple having first and second ends, the first end being threaded for engagement with an associated gas meter manifold;

an adaptor sleeve having first and second ends interconnected by an inner wall extending through the adaptor sleeve, and a series of grooves defined on the inner wall, the first end of the adaptor sleeve being received within the second end of the pipe nipple and means attaching said first end to said second end of said pipe nipple;

a casing having first and second ends, the first end of the casing receiving-the second end of the adaptor sleeve and means attaching said first end of said casing to said second end of said adaptor sleeve;

a tube having first and second ends, the first end of the tube being received within the casing and the adaptor sleeve, the second end of the tube extending beyond the second end of the casing and adapted for attachment to an associated pipe; and, a stiffener received within the first end of the tube, the stiffener being plastically deformable outwardly against the interior surface of the tube, thereby plastically deforming the first end of the tube into sealing engagement with the grooves on the inner surface of the adaptor sleeve.

34. The gas riser as defined in claim 33 wherein the stiffener includes an enlarged diameter flange at a first end and a narrowed diameter second end dimensioned for close fit receipt within the tube first end.

35. The gas riser as defined in claim 34 further comprising a seal member received around the narrowed diameter second end of the flange and located between the stiffener flange and the tube first end.

* * * * *